United States Patent
Ijäs et al.

(10) Patent No.: US 6,996,424 B2
(45) Date of Patent: Feb. 7, 2006

(54) PORTABLE, FOLDABLE ELECTRONIC DEVICE COMPRISING AT LEAST TWO USE POSITIONS

(75) Inventors: Jari Ijäs, Helsinki (FI); Christian Lindholm, Helsinki (FI); Hannu Pirskanen, Oulu (FI)

(73) Assignee: Nokia Mobile Phones, Ltd., Espoo (FI)

( * ) Notice: Subject to any disclaimer, the term of this patent is extended or adjusted under 35 U.S.C. 154(b) by 736 days.

(21) Appl. No.: 09/918,283

(22) Filed: Jul. 30, 2001

(65) Prior Publication Data

US 2002/0016191 A1    Feb. 7, 2002

(30) Foreign Application Priority Data

Aug. 3, 2000    (FI)    .................................. 20001742

(51) Int. Cl.
*H04M 1/00*    (2006.01)
(52) U.S. Cl. ................ 455/575; 455/575.1; 455/575.2; 455/575.3; 455/575.8
(58) Field of Classification Search ............ 455/575.1, 455/575.2, 575.3, 575.8
See application file for complete search history.

(56) References Cited

U.S. PATENT DOCUMENTS

| | | | | |
|---|---|---|---|---|
| 5,414,444 A | * | 5/1995 | Britz ........................... | 345/156 |
| 5,491,507 A | | 2/1996 | Umezawa et al. ............ | 348/14 |
| 5,734,513 A | | 3/1998 | Wang et al. ................. | 359/742 |
| 5,923,751 A | | 7/1999 | Ohtsuka et al. ............. | 379/433 |
| 6,047,196 A | | 4/2000 | Makela et al. .............. | 455/556 |
| 6,069,648 A | | 5/2000 | Suso et al. .................... | 348/14 |

FOREIGN PATENT DOCUMENTS

| | | |
|---|---|---|
| DE | 4204326 | 8/1992 |
| EP | 0 898 405 A | 2/1999 |
| EP | 0898223 A2 | 2/1999 |
| EP | 0898405 A2 | 2/1999 |
| EP | 0963100 A1 | 12/1999 |
| GB | 2314179 A | 12/1997 |
| GB | 2333005 | 7/1999 |
| JP | 09-305259 | 11/1997 |

* cited by examiner

*Primary Examiner*—Bing Q. Bui
*Assistant Examiner*—Rasha S. Al-Aubaidi
(74) *Attorney, Agent, or Firm*—Perman & Green, LLP

(57) ABSTRACT

A portable, foldable electronic device has an opened use position and a closed use position, and a hinge mechanism for the same. The device is constructed with at least a first housing part with at least an inner wall, a second housing part with at least an inner wall a hinge mechanism is arranged to fold the first and second housing parts relative to each other for a first use position, wherein the inner walls are placed against each other, remaining between the housing parts, and for a second use position, wherein the inner walls and simultaneously the housing parts are placed adjacent to each other. The device also has a third housing part, to which the first and the second housing parts are attached by means of the hinge mechanism in such a way that they are simultaneously folded in relation to the third housing part as well, when the device is opened and closed.

13 Claims, 7 Drawing Sheets

PORTABLE, FOLDABLE ELECTRONIC DEVICE COMPRISING AT LEAST TWO USE POSITIONS

FIELD OF THE INVENTION

The present invention relates to a portable, foldable electronic device comprising an open and closed use position.

BACKGROUND OF THE INVENTION

For storing various data, known electronic devices are available, such as notepad computers, small hand-held computers or PDA devices (personal digital assistant). The data can be viewed by means of the display of the device. The data are entered in the devices by means of a keypad or a touch screen. Also wireless communication devices, such as mobile phones, comprise a keypad and a display for storing or selecting telephone numbers. Known devices include Nokia® 8850, 77110 and 6110 mobile phones. Devices are also available having two different user interfaces, normally the user interfaces of a mobile phone and a PDA device. One such known device is Nokia® 9110 Communicator, whose first user interface (opened position) is a PDA user interface and second user interface (closed position) is a CMT user interface (cellular mobile telephone) for mobile phone functions. The device comprises separate keypads and displays for the different user interfaces. The device comprises two housing parts hinged to each other. On their inner side, the PDA user interface of the device is protected between the housing parts in the closed position of the device. The CMT user interface is on the outer side of one housing part.

A PDA/CMT device comprising two user interfaces and two different use positions is also known from U.S. Pat. No. 6,014,573. In the closed position, the device is used as a mobile phone, and in the opened position, a separate keypad and display are available. When opened, it is also possible to have e.g. a wireless connection to a communication network and to search for information by means of a browser or communication software in the device. A PDA/CMT device comprising two or more foldable housing parts is also known from U.S. Pat. No. 6,047,196. The CMT user interface is placed on the outer sides of both housing parts. One embodiment of the device also comprises a wide display which is divided into two foldable housing parts. A corresponding wide display comprising two foldable housing parts is also known from the patent publication U.S. Pat. No. 5,734,513. When the housing parts are closed, the displays remain protected therebetween. The separate displays are placed next to each other to form a wider uniform display.

It is known that devices comprising a CMT user interface only can also be provided with auxiliary functions, for example a camera, as disclosed in the application publication EP 0 963 100 A1. Electronic images produced with the camera, for example still images or video images, can be transferred to the display of the device or be transmitted in a wireless manner elsewhere in the communication network and to other CMT devices. A particular problem is induced by the placement of the camera also in the PDA/CMT device to make the use of the camera possible and simple in different positions of the device.

In known PDA/CMT devices that can be opened and closed, a problem is the placement of keys or corresponding control buttons, cursor keys, rotatable rolls or balls, rocker buttons or navigation keys in an optimal way for the use. A particular problem lies in two interfaces which are used in different positions of the device, wherein the grip of the user's hand should be simultaneously changed and/or released to make the use comfortable and to make opening of the device even possible. When opening and changing the grip, both hands are often needed. The keys for several different grips must be placed within reach of the fingers, but at the same time, they often require space e.g. on the display. To facilitate each grip, the device comprises several separate keys for the same function. When browsing, wide displays are preferable, wherein they extend even to two housing parts when the devices become smaller. To make the use of the device comfortable, the placement of the keys and the holding positions should be ergonomic. It is problematic to implement control keys for other integrated auxiliary functions and positions in PDA/CMT devices whose size is continuously reduced.

SUMMARY OF THE INVENTION

It is an aim of the present invention to provide an improvement to the prior art. In particular, the aim is to present an improved electronic device comprising at least two user interfaces, preferably a PDA/CMT communication device. The aim is to considerably facilitate the use of the device by making its handling possible with the grip of one hand both in the opened and in the closed position. In particular, the aim is to open the housing parts of the device without changing the grip or the orientation of the device. In particular, the aim is to place the keys or the like in such a way that the PDA/CMT functions of the device can be used without changing the grip and preferably in the same way by both the left and the right hand.

The device according to the invention is characterized in what will be presented in the characterizing part of claim 1. The hinge mechanism according to the invention is characterized in what will be presented in the characterizing part of claim 13.

A particular advantage is obtained when the aim is to transmit a video image of the user during a call, wherein the closed device can be easily and quickly opened to answer a video call. By means of an image sensor in the device, it is possible to create images in electrical format. The images can be electronically transferred forward and/or displayed on the display of the device. It is not necessary to release the hand from the handle part, wherein the fingers remain on the keys to secure a quick start and control of the functions. The display of the opened device is available for displaying received images e.g. during a video call.

According to the invention, the lower part of the handle is designed as a crutch. The device remains opened and vertical when placed on a base, for example on a table, and a video call can be continued by releasing the grip, wherein the hands are released for other use. At the same time, the display and the camera are directed to the user. In this position, the display presents, for different purposes, e.g. an electronical calendar, a web site or an electronic still image photographed with a camera as a screensaver or in a way resembling a frame. The handle part also supports the horizontal device in a tilted position, which makes it easier to read the display.

According to a preferred embodiment, the mechanism for moving the camera changes the orientation of the image sensor automatically when the device is opened. In one case, the image sensor will automatically follow also the user, e.g. by focusing on a detector fixed on the user. The orientation of the camera can also be changed by programming or manually, e.g. by using a 4-directional navigation key in the handle part. The orientation of images, text and other information on the display can be preferably changed in at least two positions rotated 90° in relation to each other. Thus, the opened device can be used in both the vertical and the horizontal position according to the preference of the user or the alternative which is advantageous in view of the application to be run in the device or in view of the information displayed on the display.

According to an advantageous embodiment, the electronic displays located in the two different housing parts are placed adjacent to each other in the opened device, forming a display area which is as seamless and uniform as possible. The display area is slightly folded, but it is preferably substantially planar. This makes it possible to display larger units than one display at one time. Placed on the side of the displays, also adjacent, are also the stereo speakers of the device, for example on both sides of the displays.

The hinge mechanism of the device places the housing parts next to each other, and also the total width of the device can be reduced when the housing parts, placed against each other, are moved thereby partly into the handle-like housing part. The displays are protected between the housing parts. The hinge system can be hidden behind the housing parts and inside the handle part, and it comprises a mechanism which automatically opens and preferably also unfolds the device. By means of the hinge system, the point of revolution of the housing parts can be placed right at the edge of the inner walls, facilitating the implementation of various integrated foldable displays.

Also in the closed position, the PDA/CMT device is held by the handle part, wherein it is also provided with an electronic display, for example for selecting telephone numbers from a list to be scrolled on the display. A telephone number is selected and a call is started and terminated by using control buttons, a navigation key or the like in the handle part. The earpiece of the phone is placed in the upper part of the opening housing part, and the microphone is placed in the lower part.

The PDA/CMT device is preferably a flat device comprising two designed and substantially parallel side surfaces. A flat side surface is formed by the outer side of one opening housing part as well as the side surface of the handle part, separated by the hinge seam. The opening housing parts, placed against each other, are located on opposite sides of the device, next to the handle part. The handle part and the other housing parts are preferably stationary in relation to each other when the device is in the closed position.

In one advantageous embodiment, the upper part of the handle part is provided with the viewfinder of an electronic camera. In the closed device, the image sensor of the camera is oriented in the same direction as the viewfinder. Taking of an electronic image is controlled by control buttons in the handle part. The display of the handle part is also used as the display for the camera.

In one embodiment, it is also possible to connect to the device a wirelessly operating headset device comprising one or more earpieces and a headset. The device can be used e.g. as a hands-free device. According to another advantageous embodiment, these are also used for listening to music which is transmitted from the PDA/CMT device in digital format in a wireless manner. The music is stored in the memory means of the device and/or it is transmitted to the device by using a wireless communication network. The functions are controlled by using the above-mentioned keys or buttons in the handle part. The headset device can also be equipped with a control unit comprising e.g. a display and keys.

According to an advantageous embodiment, the device is controlled in a wireless manner by means of the headset control unit.

In the following, the invention will be described in more detail by using as an example an electronic PDA/CMT communication device according to a preferred embodiment. In this context, reference is made to the appended drawings, in which:

DETAILED DESCRIPTION OF THE INVENTION

Figure 1:
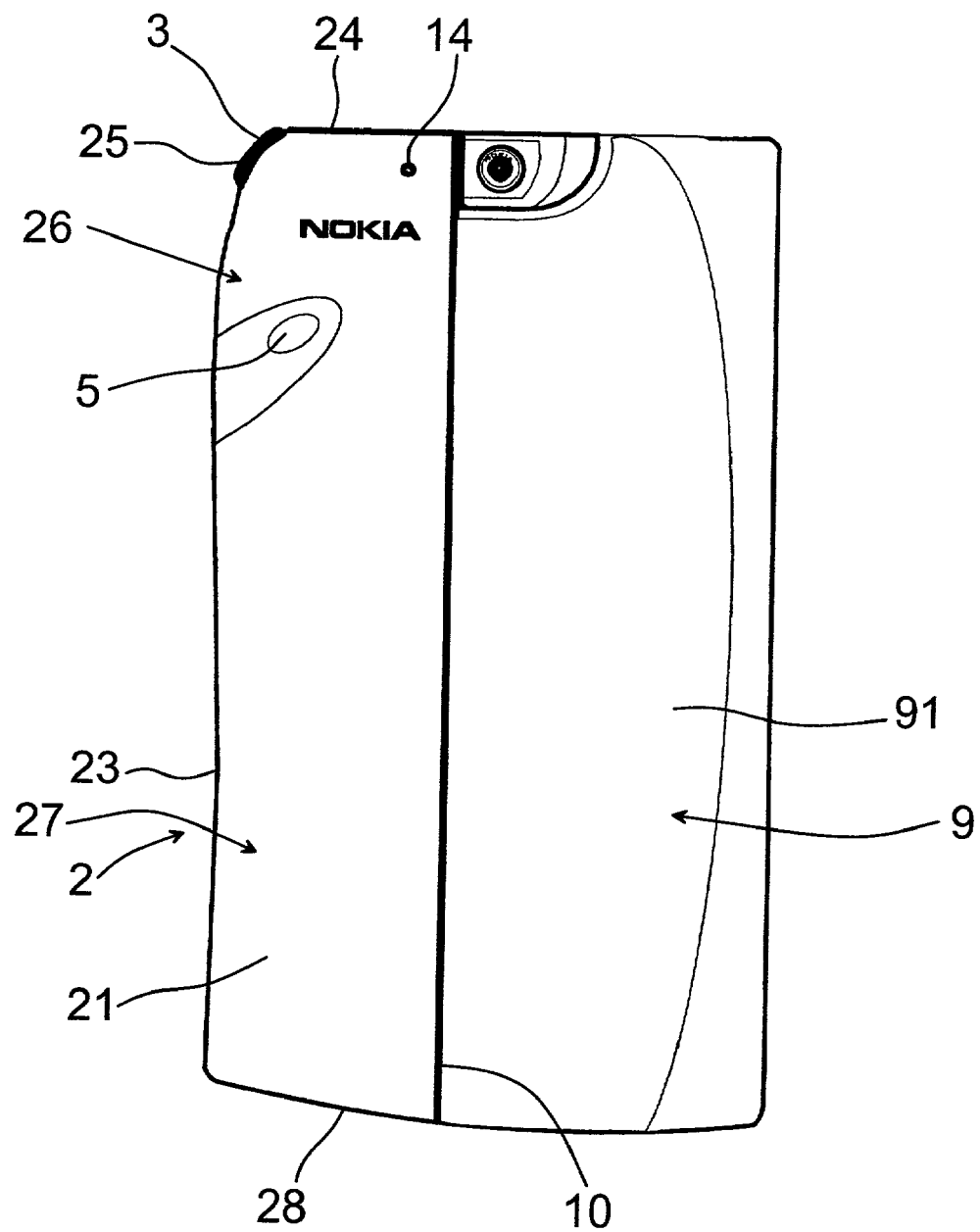
FIG. 1 shows an electronic device according to a preferred embodiment of the example, particularly a PDA/CMT device in a closed position and seen from the left hand side.
Figure 2:
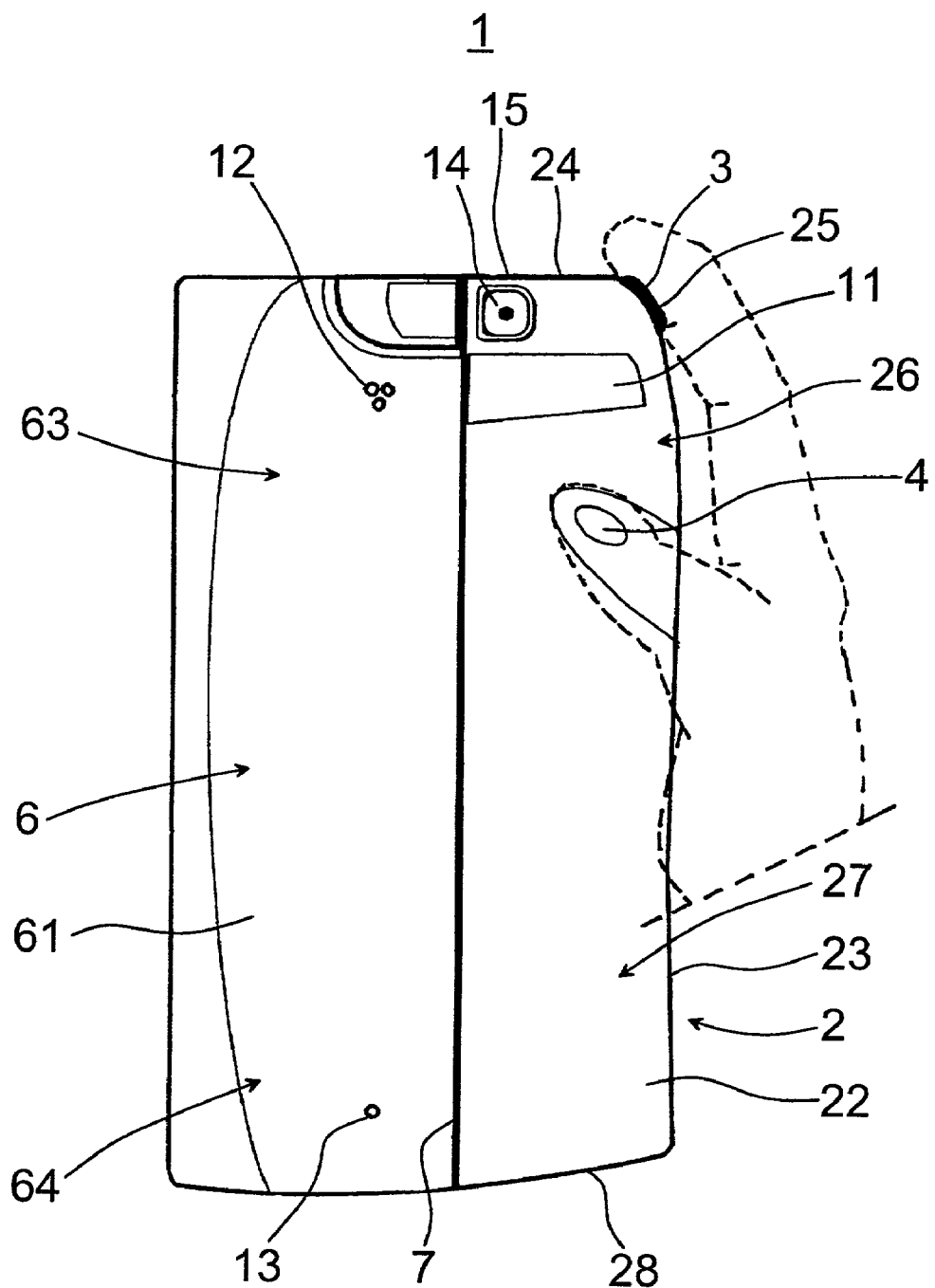
FIG. 2 shows the device of FIG. 1 in a closed position and seen from the right hand side.
Figure 4:
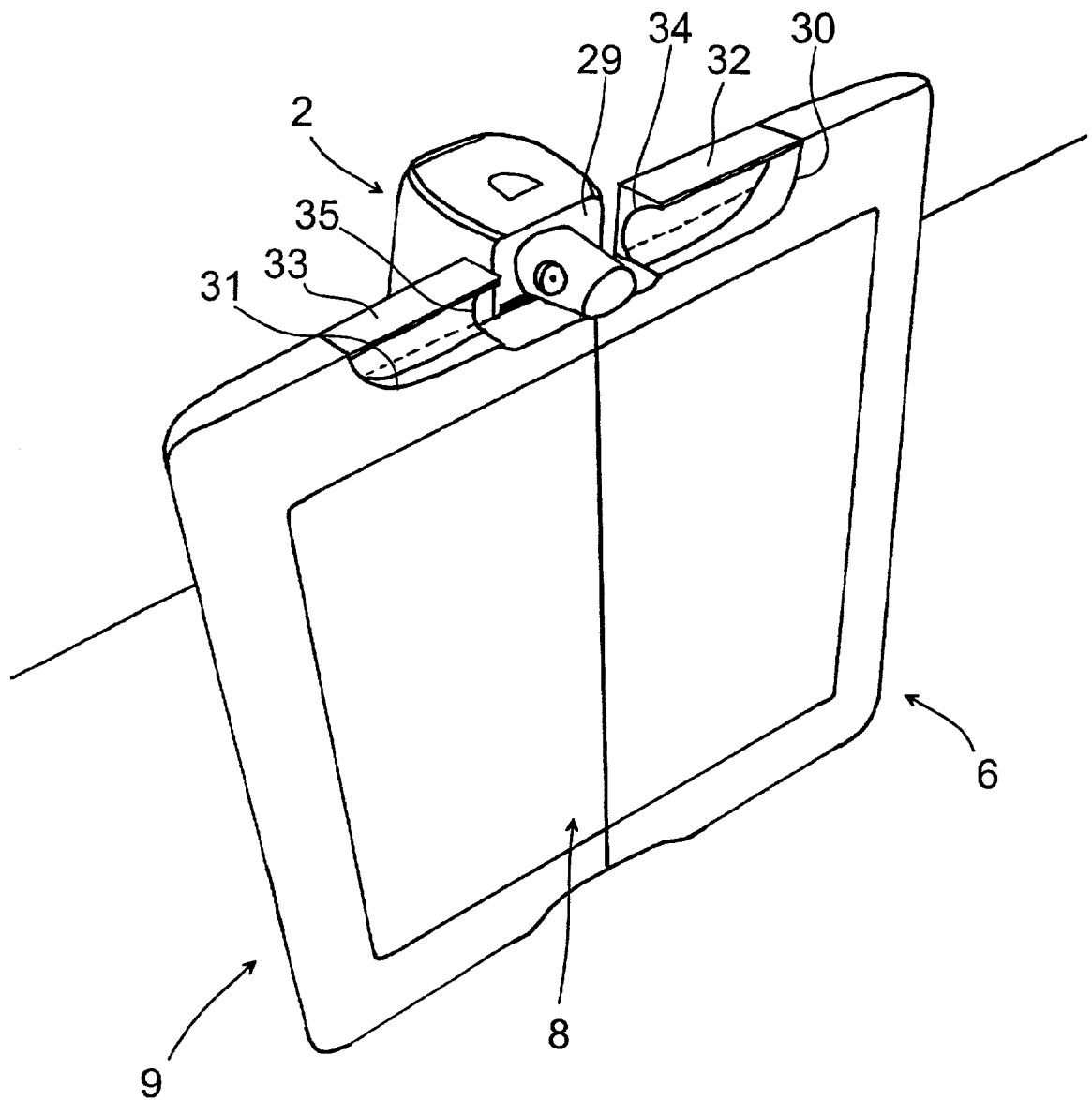
FIG. 4 shows the device of FIG. 1 in an open position in a perspective view, seen from the front left side and sloping downwards.

With reference to FIGS. 1 and 2, a communication device 1, in the following description also called device 1, comprises in the use position a horizontal handle-like housing part 2 comprising a substantially even side surface 21. The housing part 2 is arranged for holding the device 1 in the user's palm. A side surface 22 with a substantially identical shape is located on the opposite side of the housing part 2, i.e. the handle part 2, and the device 1. FIG. 2 also illustrates the user's grip to hold the device 1. In FIGS. 1 and 2, the device 1 is shown in a closed position (CMT use position), but the device 1 is held in a corresponding manner when it is in its opened position (PDA use position), as shown in FIG. 4. A right-handed user has the thumb and the other fingers on the sides 22 and 21, respectively; a left-handed user vice versa. The forefinger is placed on top of the handle 2 when using the navigation key 3. The handle part 2 also comprises a side surface 23 between the side surfaces 21, 22, placed against the user's palm. The side surface 23 extends transversely across the palm between the thumb and the other fingers, when the device 1 is held in the use position and in a substantially vertical position. In FIG. 2, the side surface 23 and the longitudinal direction of the device 1 are placed substantially parallel to the forefinger. The side surface 23 is supported by the palm, resting on it, when the palm is directed towards the user's face, sloping upwards. The device 1 is thus horizontal or slightly slanted. The fingers are simultaneously used to support the handle part 2 by pressing the side surfaces 21 and 22, wherein the swinging of the device 1 is efficiently prevented during the use or the opening.

To control the functions of the device 1, the handle part 2 is provided with a set of keys, control buttons, navigation keys or the like within the reach of the fingers. When the device 1 is held as shown in FIG. 2, the forefinger extends to the upper surface 24 of the handle part 2 and to the edge 25 where a navigation key 3 is placed. Depending on the design of the device 1, the key 3 can be placed even entirely on the top surface 24 or the side surface 23, being placed, however, symmetrically between the sides 21, 23 for both hands, but preferably it is in the corner 25. The control key 4 is placed underneath the thumb, and in a corresponding position on the side 21 there is a control button 5 within the reach of e.g. the forefinger. The device 1 is supported with the fingers from different sides, when the key 4 or 5 is pressed down, and at the same time, the lower part of the palm is supported to the handle part 2. The buttons 4 and 5 are placed in the upper part 26 of the handle part 2. For left- and right-handed use, the navigation key 3 is symmetrically located in relation to the side surfaces 21 and 22. If the buttons 4 and 5 have different functions, it is possible that their functions can be exchanged for different hands by programming and by means of the control system of the device.

The lower surface 28 of the lower part 27 of the handle part 2 is designed in such a way that the opened device 1 is supported against its base and remains in the vertical position as shown in FIG. 4. The device 1 is also supported by the unfolded housing parts 6 and 9, when the lower part 27 extends downwards substantially on the same level with the housing parts 6 and 9. The display 8 of the device is thus tilted approximately 10–30° backwards, wherein it is easily readable when the user is sitting at a table. At the same time, the camera to be used during a video call can be better directed towards the user. The mass center of the device 1 is placed on the front side of the supporting point provided by the lower surface 28.

Figure 5:
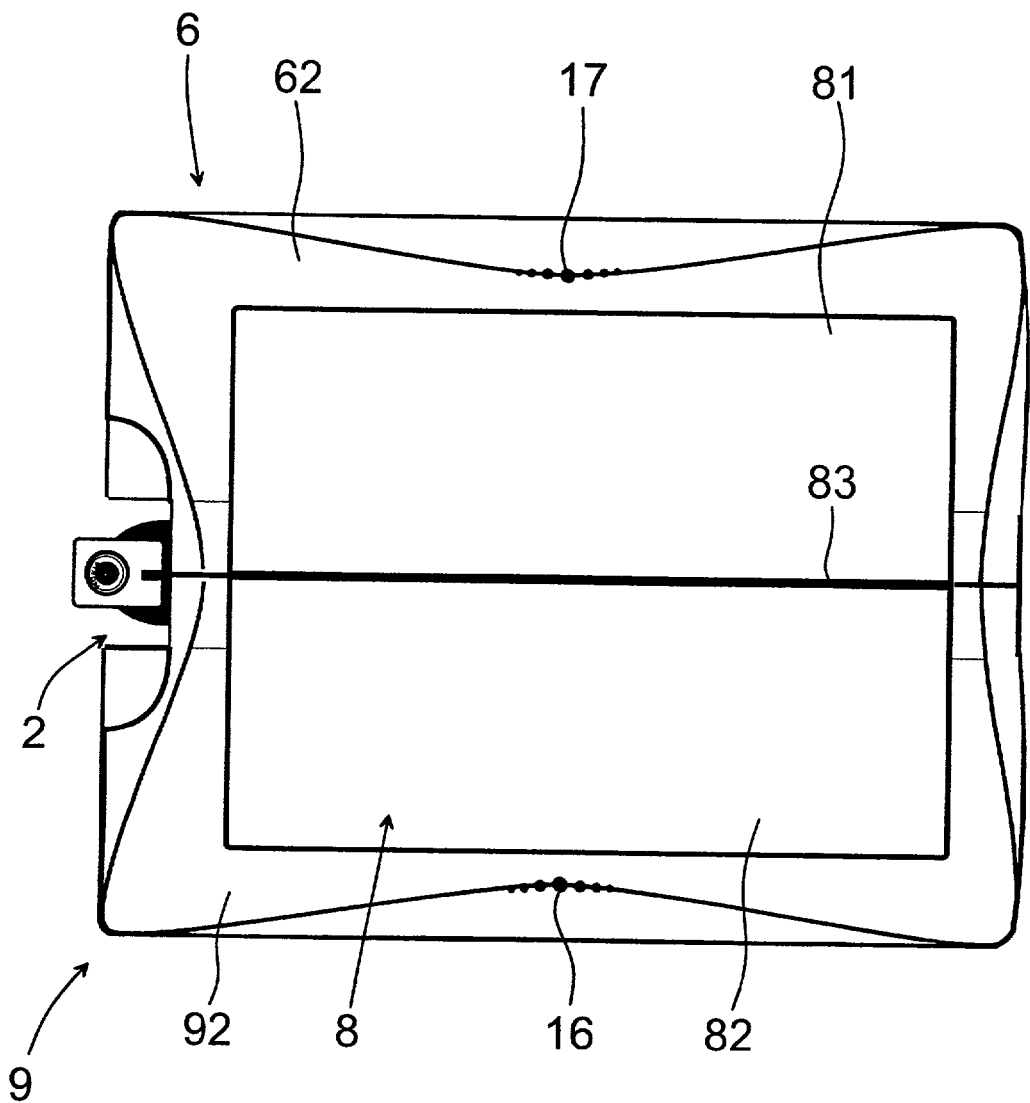
FIG. 5 shows the device of FIG. 1 in an opened horizontal position and seen from the front.

With reference to FIG. 2, the device comprises a first housing part 6 comprising an outer wall 61 which is simultaneously the side and outer surface of the device 1. Part of the outer surface of the device 1 is also formed by the side surface 22. The side surface 22 and the outer wall 61 constitute a substantially even surface which is divided into two halves separated by a longitudinal seam 7 at the hinge. The housing part 6 is on that side of the handle part 2 which is opposite to the side surface 23. This side is facing the user in the opened position of the device 1, as shown in FIG. 5, when the planar electronical display 8 is being viewed. On this side there is also a side surface 28, as shown in FIG. 4. In this use position, the palm is facing the viewer, and the handle part 2 is oriented away from the user in a direction which is perpendicular (90° angular difference) to the plane defined by the display 8. In the presented embodiment, an electronic display 81 placed on the inner wall 62 of the housing part 6 and an electronic display 82 placed on the inner wall 92 of the housing part 9 are substantially parallel, when the device 1 is fully opened, as shown in FIG. 5. They are placed as close to each other as possible, to form a uniform planar display area 8. The displays 81, 82 and thereby the housing parts 6, 9 move to the opposite position (I position shown in FIG. 6), wherein the angular difference is 0°, and to an adjacent position (T position shown in FIG. 4), wherein the angular difference is even 180°, varying for example between 165° and 180°. The handle part 2 is placed at the hinge at the seam between the housing parts 6, 9. In the opposite position, the housing parts 6, 9 are parallel with the handle part 2 (0° angular difference).

The device 1 comprises a corresponding second housing part 9 comprising an outer wall 91 which simultaneously constitutes the side and outer surface of the device 1. Part of the outer surface of the device 1 is also formed by the side surface 21. The side surface 21 and the outer wall 91 constitute a substantially even surface which is divided into two halves separated by a longitudinal seam 10 at the hinge. In the closed position, the inner walls 62, 92 are placed against each other, close to and facing each other, wherein the displays 81, 92 are simultaneously folded together. The displays 81, 82 and the inner walls 62 and 92 are protected between the housing parts 6, 9. Separately, the displays 81, 82 are substantially rectangular, and when combined by placing their long edges adjacent to each other, they constitute a foldable, almost quadratic display 8. In one embodiment, the angular position of at least one of the housing parts in relation to the other housing part can be adjusted, e.g. to an angular difference between 0° and 15°. This makes the use easier in the position of FIG. 5, wherein the display 82 represents a QWERTY keyboard and the display 81 displays the text written. Thus at least the display 82 is a touch screen. The device 1 can be readily opened in this angular position, from which it can be moved to the fully opened position shown in FIG. 5 (0° angular difference). The longitudinal edges of the housing parts 2 and 9 are supported against a base to make it easier to write.

As shown in FIG. 2, the upper part 26 of the handle part 2 is provided with an electronic display 11 which is used in the CMT mode for displaying data and information known from mobile phones. These include e.g. text messages, menus for phone settings, the number of an incoming call, the selected phone number, or a phone number list which is browsed. For the CMT mode, the upper part 63 of the housing part 6 is equipped with a set of openings 12 for the phone earpiece which is placed against the user's ear. The earpiece is placed inside the housing 6 and arranged for converting electric signals into audible sound. The lower part 64 of the housing part 6 is equipped with a necessary set of openings 13 for a phone microphone which is placed inside the housing part 6 and arranged for converting the user's speech into an electric signal. The earpiece and the microphone can also be provided in a separate auxiliary device in a wireless radio frequency (RF) or infra-red (IR) connection with the device 1, wherein the microphone and the earpiece can be easily used also in the opened position and in the PDA mode. In particular, Bluetooth™ wireless technology, which is known as such and is suitable for short-range communication, is applied in the implementation.

Selections from a menu or a list are made by using the button 4 or 5. For example, the button 4 corresponds to the SEND button of a phone (starting a call, answering a call), and the button 5 corresponds to the END button of a phone (terminating a call). Alternatively, the menus are browsed and a telephone number is selected with the navigation key 3, which can be rocked at least forward and backward (corresponding to ARROW UP and ARROW DOWN keys). Thus, the key 3 rocks in the direction of the upper surface 24 and the side surface 23. To make and/or confirm a selection, the key 3 can also be pressed down by a finger (corresponding to the MENU key of a phone). Text can be written by the key 3 or the like by first selecting the write mode and then browsing the letters. A letter is selected by the button function of the key 3 (alternatively by the key 4 and/or 5), as also terminating or sending a text message.

An advantageous embodiment of the device 1 of FIG. 2 comprises an optical lens arrangement 14 which extends through the handle part 2 and is the viewfinder of the electronic camera. The viewfinder 14 is arranged at the upper edge of the side surface 22, and it is oriented away from the user in a direction which is substantially perpendicular to the side surface 21. Alternatively, the view is displayed on the display 11 which is preferably a liquid crystal display (LCD) known as such. The view can be obtained as an image from the image sensor of the camera, converting the optical image to electric signals. The image sensor is for example a charge coupled device (CCD) known as such. On the basis of the view, the camera is focused to its object to take a still or video image. The image is stored in digital format in the memory means of the device 1, and it can also be transmitted further in a wireless manner in the CMT and PDA modes. Menus and symbols related to the function of the camera, such as dates and image management, are displayed on the display 11. The button of the key 3 or the control button 4 (or control button 5) is used as a release button, and the menus are controlled e.g. by the key 3.

According to an advantageous embodiment, the device 1 is used for listening music stored in digital format in the memory means. Furthermore, music signals can be directed to the separate headset device described above. The necessary memory means as well as the means for controlling the functions are alternatively placed in a separate headset control unit. The electric music signals are transferred by means of the device 1 from a communication network to the control unit. On the inner walls 62, 92, the device 1 is also provided with sets of openings 16, 17 for stereo speakers. The speakers are inside the housing parts 6, 9. The music functions can be alternatively controlled in the closed position by means of the display 11 and the keys 3, 4 and 5. If the device 1 comprises several different functional modes, e.g. PDA, CMT, camera and player modes, the default mode is the CMT mode for receiving calls. The display 11 thus displays a menu for selecting the other modes. In each mode, the functions of the keys and the like are determined according to the selected mode. According to the invention, in the different modes, the device 1 can still be used without changing or releasing the grip of one hand, as well as by controlling it with the control buttons 4, 5 and the navigation key 3.

The buttons 4 and 5 are dome-like film keys which click when pressed down and return up automatically. Preferably, the same film covers both the key 4 (or key 5) and the side surface 22 (or side surface 21), forming a seamless side surface. The button, designed as a bulge with the size of a fingertip, is placed in a low recess in the side surface. Preferably, also the button function of the key 3 clicks and returns up automatically. The click gives the user a clear feel of operation of the key. For versatile menu functions and for controlling the cursor moving on the display, the key 3 rocks in 2 to 8 different directions (up and down, preferably also left and right in the direction of the side surfaces). Corresponding to each direction or pressing, the key 3 gives a continuous or short electric signal for controlling the device 1. The key 3 is for example round and fitted in a cradle formed in the handle part 2. Alternatively, the key 3 is a roll, disc or ball which can be rotated in at least two directions and which also allows pressing down. The rotation axis of the roll is substantially perpendicular to the side surfaces 21, 22.

Figure 6:
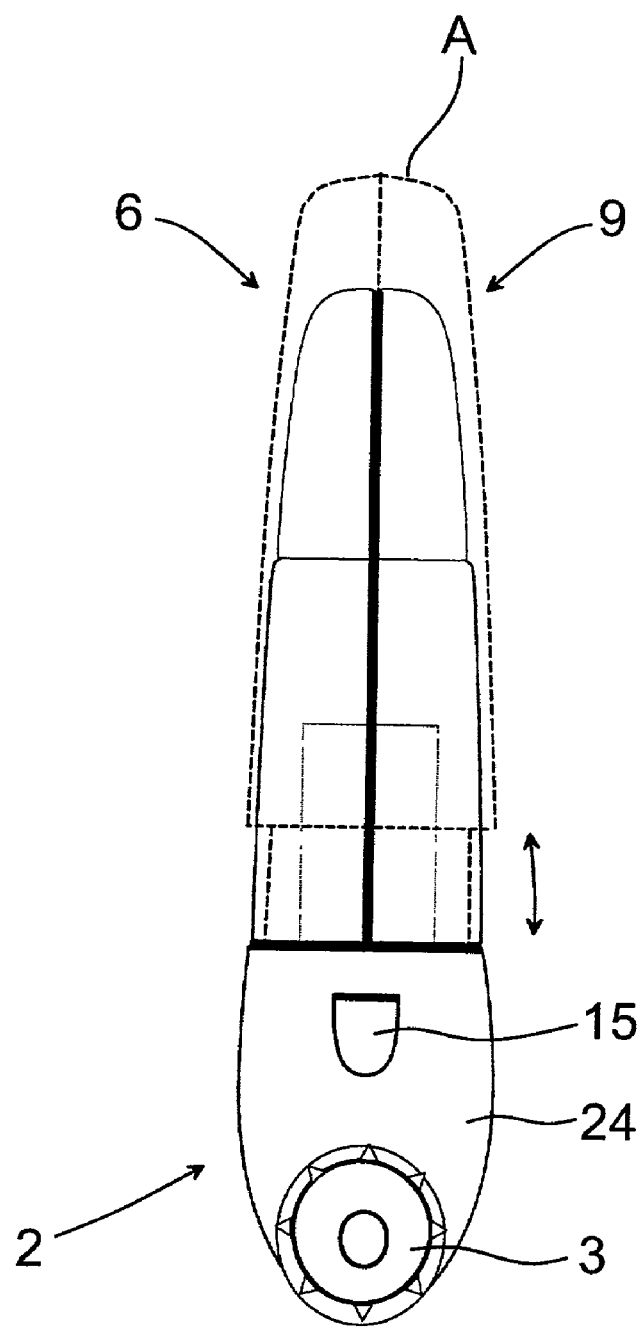
FIG. 6 shows the device of FIG. 1 in a closed position and seen from above.

To facilitate the use, the device 1 is automatically opened by a button 15 which is fitted in a nest formed on the upper surface 24, as shown in FIG. 6. According to one embodiment, the button 15 is a mechanically operated locking device triggering a spring-actuated hinge mechanism. Thus, the grip does not need to be released, opening by one hand is possible, and the device 1 is quickly opened to the position of FIG. 4 or 5, for example for a video call. Thus, the camera is also available, and menus displayed on the touch screen 8 can be browsed by one hand.

Figure 3:
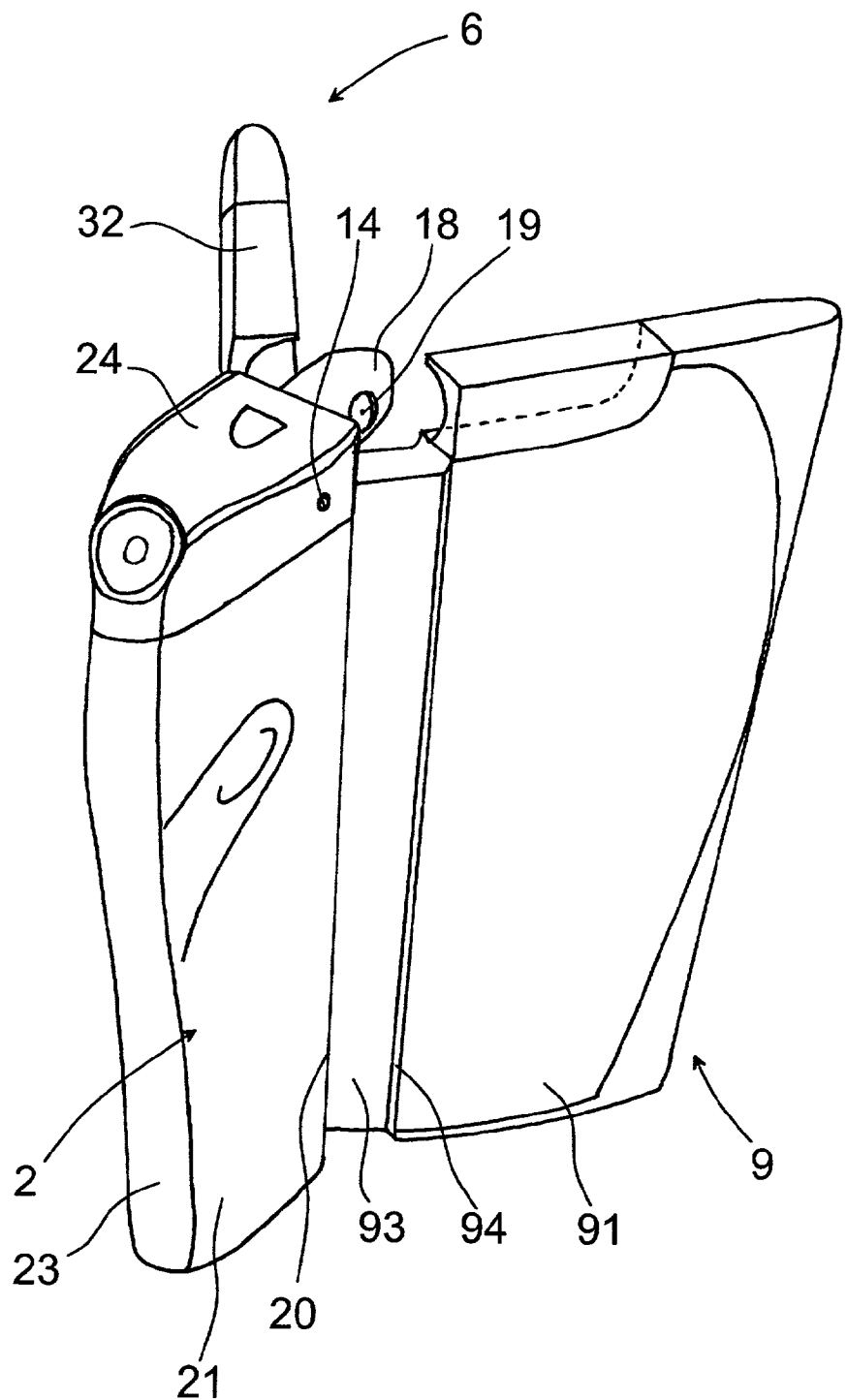
FIG. 3 shows the device of FIG. 1 in a semi-open position in a perspective view, seen from the rear left side and sloping downwards.

When the device 1 is opened, the housing parts 6, 9 first move away from the handle part 2, in the position of FIG. 6 upwards, after which they can be opened as shown in FIG. 3. In FIG. 6, the transfer movement and the intermediate position of the housing parts 6, 9 are shown with a broken line A. From FIGS. 1 and 5, it is seen that the width of the inner wall 92, corresponding to the width of the inner wall 62, is greater than the width of the outer wall 91, which corresponds to the width of the outer wall 62. The housing parts 6, 9 are moved this difference into the handle part 2, wherein the total width of the closed device 1 is reduced, in the presented embodiment by about 10%. FIG. 3 shows side edge 93 placed lower than side edge 91, and the edge 94 therebetween, as well as an equal edge 20 in the handle part 2. The edges 94 and 20 are placed against each other and form a narrow seam 10 according to FIG. 1. The hinge system on the wall edge 93 is not visible in FIG. 3. The housing part 6 is provided with corresponding structures. The housing parts 6, 9 are supported against the inner parts of the handle part 2 and against each other, to prevent folding.

In one embodiment, the housing parts 6, 9 are glided out and unfolded by means of force effects of springs under tension. The device is closed by gripping the parts 6 and 9 by one hand, folding them against each other and pressing them inside the handle part 2. The grip of the other hand still corresponds to that shown in FIG. 2. In the closed position, the handle part and the housing parts constitute an integrated locked structure which cannot be bent. In the opened position, the device 1 remains by itself in the position shown for example in FIG. 4.

According to one embodiment of the FIGS. 3 and 4, a camera arm 18 for an image sensor is provided on the surface 29 of the upper part 26 in the handle 2. The horizontal camera arm 18 is placed between the housing parts 6, 9, and it has a set of openings 19 for the sensor lense arrangement. In the closed position, the sensor is oriented in the same direction as the viewfinder 14. The camera arm 18 is rotatable around its longitudinal axis downwards and in the opposite direction in a sector of at least 180°. The axis of rotation is substantially perpendicular to the side 29 and the walls 62, 92 in the opened position of FIG. 4. As the camera arm 18 can also be turned at least 90° upwards as shown in FIG. 5, the camera can be directed to a wide area, if the device 1 is supported stationary on its base. The axis of rotation is perpendicular to the sides 21, 22. To the position of FIG. 5, the camera arm 18 is bent or placed by means of an arch-like slide rail, at the end of which the camera arm 18 is fixed. Alternatively, the camera arm 18 is placed in the housing part 6, by the right window 32 and parallel with the wall 62. The set of openings is thus oriented towards the user in a direction which is substantially perpendicular to the surface 62, wherein in the closed position, the camera is oriented in the direction of the viewfinder without moving the camera arm. The arm 18 can also be provided with rotation around its longitudinal axis to direct the camera downwards and upwards.

The camera arm 18 is placed in the position of FIGS. 1 and 5 preferably automatically by means of an electrical and/or mechanical mechanism. Preferably, the position can also be controlled with the navigation key 3. An image obtained from the image sensor can be preferably displayed on the display 81 and/or 82, on the basis of which image the orientation of the camera can be checked. As the orientation of the information displayed on the display 8 can be exchanged, the device 1 can be used in the positions of both FIG. 4 and FIG. 5. In the position of FIG. 5, the device 1 has a lower gradient angle, about 60° to 80° slanted backwards.

The arm 18 is left between the housing parts 6 and 9, wherein their upper edge, extending to the edge on the side of the handle part 2, is provided with indentations 30 and 31 of equal shape. They are provided with transparent windows 32, 33 which are equipped with recesses 34 and 35, in which each the arm 18 can be fitted in half. The recesses are on the side of the inner walls 62, 92 and constitute a uniform space. In the closed device 1, the arm 18 is placed in a shield between the windows 32, 33 and ready for the camera functions as shown in FIG. 1.

Figure 7:
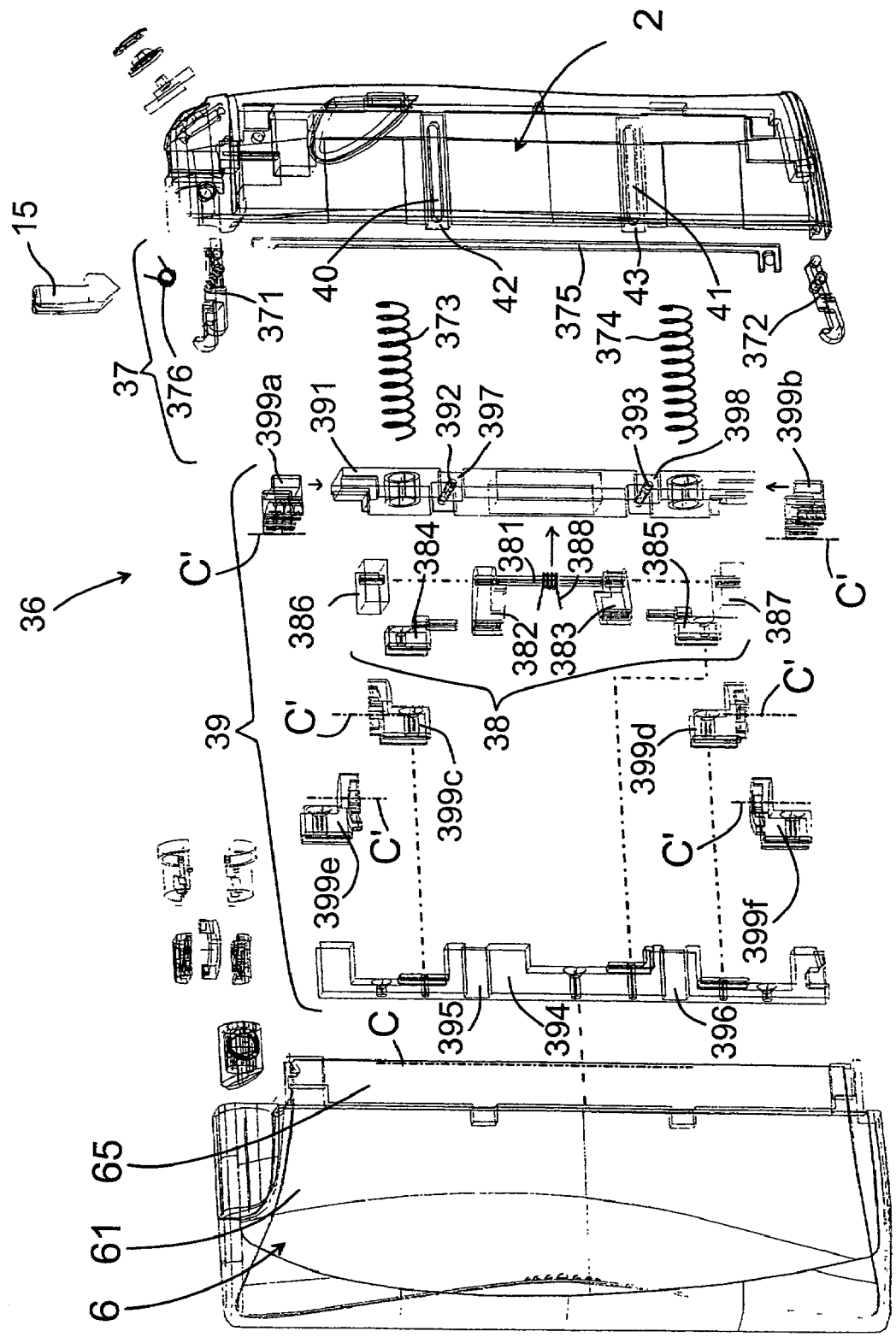
FIG. 7 shows the device of FIG. 1 in a closed position and seen from above.

FIG. 7 shows, in more detail, a hinge mechanism 36 for the device 1 according to an advantageous embodiment. FIG. 7 only shows the fixing of the housing part 6 and one half of the split handle part 2. The other half of the handle part has an identical shape in mirror image. The mechanism comprises an ejector mechanism 37 for ejecting the housing parts 6, 9 and the hinge system out of the handle part 2, an unfolding mechanism 38 to assist in the opening of the housing parts 6 and 9, and a hinge system 39 for folding the housing parts 6, 9 together and in relation to the handle part 2.

The ejector mechanism 37 comprises one or more locking clutches 371 and 372 fitted in the handle part 2. They keep the housing parts 6, 9 stationary in the closed position and form a counter-force for one or more spring means, for example pressure springs 373 and 374, which continuously tend to move the housing parts 6, 9 apart from the handle part 2. A button 15 is arranged to press the upper clutch 371 (in the upper part of the handle part 2) which, by means of rod transmission, also turns the lower clutch 372 (in the lower part of the handle part 2). A spring 376 turns the clutches into a locking position.

The hinge system 39 comprises a hinge beam 391 which is parallel with the longitudinal direction of the handle part 2. Pushed by the springs 373, 374, a beam 391 glides inside the handle part 2 away from the user's palm. In the opposite direction, the beam 391 is glided by hand. The movement is limited by pins 392 and 393 whose ends are placed in grooves 40, 41 inside the handle part 2. The grooves are formed in transverse ridges 42 and 43 which are also used as guiding rails and are placed in grooves in the other parts of the mechanism. A hinge beam 394 is fixed at one side to the side wall 65 of the housing part 6, and it is parallel to the beam 391. The side surface 65 is placed lower than the parallel side surface 61. The other side of the beam 394 forms a surface corresponding to the side wall 93 of FIG. 3 in the housing part 6. The structure is preferably covered to form a uniform side surface and to hide the hinge system.

A structure corresponding to the beam 394 can be manufactured and integrated in the part 6. The hinge system comprises a parallel hinge beam for the housing part 9 (not shown in the figure), corresponding to the beam 394. The beams 391, 394 are provided with grooves 395, 396, 397 and 398 for the ridges 42, 43, used as glides. The beam 394 does not bend or move in relation to the housing part 6, and the beam 391 does not bend in relation to the handle part 2. The beams 391, 394 are bent around a joint rotation axis C in such a way that their distance from the rotation axis C remains constant.

The hinge system 39 comprises at least a glide part 399a fixed to the upper part of the beam 391 and a glide part 399b fixed to the lower part of the beam 391, their upper and lower surfaces being equipped with arch-like glide grooves. The glide parts extend towards the parts 6, 9. To the upper part of the beam 394 is fixed a counterpart 399c extending towards the part 2 and provided with an arch-like neck gliding in the groove of the glide part 399a. The glide part 399b and a counterpart 399d, fixed to the lower part of the beam 394, function pairwise in a corresponding way. The turning points C' of the glide parts and the counterparts are arranged to be placed on a joint rotation axis C which is at the level of the inner walls 62, 92 shown in FIG. 5 and in the seam 83 when the device 1 is folded up. Thus, the housing parts 6, 9 remain attached to each other, and simultaneously also the displays 81, 82 are placed adjacent to each other as tightly as possible. The rotation axis C is parallel to the longitudinal axis of the handle part 2. The opening movement can be limited in such a way that the surface 65 is placed against the ends of the glide parts 399a, 399b. To the upper part of the beam 9 is fixed a counterpart 399e extending towards the part 2 and provided with an arch-like neck gliding in the groove of the glide part 399a. A counterpart 446 fixed to the upper part of the support beam operates in a corresponding manner. The glide part 399b and a counterpart 399f, fixed to the lower part of the hinge beam, function pairwise in a corresponding way. To save space, the pair of counterparts 399c and 399e as well as the pair of counterparts 399d and 399f are placed on opposite sides of their glide parts.

The unfolding mechanism 38 comprises arms 382 and 383 arranged on a joint longitudinal shaft journal 381 and extending towards the parts 6, 9. The pin 381 and the arms 382, 383 are allowed to move in the transverse direction, towards the parts 6, 9 in relation to the beam 391. The arms 383 and 382 are fixed to the beam 394 and to the hinge beam of the housing part 9 by means of a hinge pin 385 and a hinge pin 384, respectively. The parallel rotation axes in the longitudinal direction of the hinge pins 384, 385 are placed on opposite sides of the axis C, and each rotation axis on the side of the housing part to which also the hinge pin is fixed. The rotation axes are slightly closer to the part 2 than the axis C. The pin 381 is also provided with a tensioned torsional spring 388 which is continuously effective between the arms 382, 383 and tends to turn them around the pin 381 towards each other and to be parallel. Thus, a torque force is simultaneously produced, tending to turn the hinge pins 384, 385 towards each other around the rotation axis C. The hinge pins 384, 385 are turned so that the direction of their rotation axes is maintained. This, in turn, produces a torque effective on the housing parts 6, 9 to make them open when ejected, wherein when they are pushed in, the grooves 395, 396 are supported to the ridges 42, 43 of the housing part 2. When turned, the distances between the rotation axis of the hinge pin and the axis C on one hand and between the rotation axis of the hinge pin and the pin 381 on the other hand remain constant, with the result that the position of the pin 381 in relation to the beam and the handle part 2 will vary. Therefore, the pin and the arms are fitted in a movable manner in a nest in the middle part of the beam 391. Further, the ends of the pin 381 are provided with fitting parts 386 and 387.

The electrical components of the PDA/CMT device, such as the circuit boards, the transceiver fitted on a circuit board with its electrical circuits and antenna, as well as the control circuits for controlling the displays and the whole device, are arranged in free spaces left between the housing parts. The keys and the control buttons are in an electrical contact with the control circuits. The operation of the whole device is controlled by a control system operating under a control program stored in the memory means and arranged for controlling the above-described device in a desired manner.

The design, manufacture and placement of the necessary components as well as the arrangement of the functions can be selected by anyone skilled in the art according to the requirements at the time. In the selection, it is possible to apply technology and methods known as such. The requirements depend on e.g. the different properties of the device, such as camera or music functions, the capacity of the necessary memory means, the connections to other devices, and the network or networks used for wireless communication, such as a GSM mobile communication network based on a cellular network and/or a short-range RF or IR network. The device with its antenna is arranged to operate in a desired, preferably broadband communication network, e.g. to make the transfer of video calls possible.

The invention has been described above in an application in connection with an advantageous communication device, to which it is particularly well suited, but on the basis of the description, it is obvious for anyone skilled in the art to apply the invention also in connection with other electronic devices within the scope of the appended claims. The device can naturally be also used with other alternative hand grips and in other positions. The presented grip and use position thus provide an example of a preferred way of holding the device of the invention, wherein the keys of the handle part are placed in such a way that at least this grip and the use of several different functions would be possible and easy.

What is claimed is:

1. A portable, foldable electronic device having an opened use position and a closed use position, said device comprising at least:
   a first housing part having at least an inner wall,
   a second housing part having at least an inner wall,
   a hinge mechanism adapted to fold the first and the second housing parts into the closed use position in relation to each other for a first use position, wherein the inner walls are against each other and remain between the housing parts, and to fold said first and second housing parts in the opened use position for a second use position, wherein the inner walls are adjacent to each other, and wherein the device can also be used on the side of the inner walls,
   a third housing part, to which the first and the second housing parts are attached by means of said hinge mechanism in such a way that the first and the second housing parts are simultaneously folded in relation to the third housing part, when the device is opened in said second use position and closed in said first use position.
   wherein the first and the second housing parts placed against each other are arranged, upon closing in said first use position, to partly move inside the third housing part to reduce the outer dimensions of the device, and
   wherein the first and the second housing parts are arranged to move away from the third housing part before opening in opposite directions in said second use position.

2. The device according to claim 1, wherein the device further comprises first electronic display means arranged on the inner wall of the first and/or the second housing part, and second electronic display means arranged in the third housing part.

3. The device according to claim 2, wherein, in said closed use position, the housing parts constitute a substantially integrated, rigid housing structure.

4. The device according to claim 1, wherein the device further comprises:
   first electronic display means arranged on the inner wall of the first and/or second housing part,
   second electronic display means arranged in the third housing part, and
   a set of electronic keys arranged in the third housing part, which electronic keys are arranged to control the functions of the device and the information displayed on the first and the second display means at the same time when the device is held at the third housing part.

5. The device according to claim 4, wherein the first display means comprise a uniform, foldable electronic display placed on the inner walls of the first and second housing parts and arranged for displaying information, texts and images in at least two different orientations for a vertical and a horizontal position of the device.

6. The device according to claim 1, wherein, in the opened use position, the third housing part, which is arranged for holding the device when the device is closed and opened, is on the opposite side of the device in relation to the inner walls, extending in a direction which is perpendicular to said inner walls.

7. The device according to claim 1, wherein, in the opened use position, the inner walls are parallel and placed adjacent to each other to form a uniform inner wall.

8. The device according to claim 1, wherein one of the housing parts is provided with electronic image sensor means for still and/or video images.

9. The device according to claim 8, wherein the electronic image sensor means comprise a turnable camera arm extending from the third housing part in between the first and the second housing parts, provided with a space and a transparent housing for the camera arm and to protect the camera arm.

10. The device according to claim 1, wherein the hinge mechanism comprises:
    a hinge system arranged for folding the first and the second housing parts in relation to each other and in relation to the third housing part,
    an ejector mechanism arranged to move the first and the second housing parts and the hinge system away from the third housing part upon opening, and
    an unfolding mechanism arranged to assist in the opening of the first and the second housing parts.

11. The device according to claim 7, wherein the first and the second housing parts are arranged to turn around a joint rotation axis which is placed between said housing parts and in the same plane with their inner walls.

12. The device according to claim 1, wherein the device is a communication device comprising at least a cellular mobile telephone user interface which is available in the closed use position of the device, and at least a PDA user interface which is available in the opened use position of the device.

13. Portable, foldable electronic device comprising an opened use position and a closed use position, said device comprising at least:
    a first housing part comprising at least an inner wall,
    a second housing part comprising at least an inner wall,
    a hinge mechanism arranged to fold the first and the second housing parts in the closed use position in relation to each other for a first use position, wherein the inner walls are against each other, remaining between the housing parts, and in the opened use position for a second use position, wherein the inner walls are adjacent to each other, and wherein the device can also be used on the side of the inner walls, a third housing part, to which the first and the second housing parts are attached by means of said hinge mechanism in such a way that the first and the second housing parts are simultaneously folded in relation to the third housing part, when the device is opened in said second use position and closed in said first use position, first electronic display means arranged on the inner wall of the first and/or second housing part, second electronic display means arranged in the third housing part, and a set of electronic keys arranged in the third housing part, wherein the electronic keys are arranged to control the functions of the device and the information displayed on the first and the second display means at the same time when the device is held at the third housing part.

* * * * *